INVENTORS
THEODORE C. BAKER
BENNY B. MATHIAS
JAMES R. SAGER
LOWELL W. SEBRING
BY
ATTORNEYS

United States Patent Office 3,289,309
Patented Dec. 6, 1966

3,289,309
TUBING DIAMETER GAUGE
Theodore C. Baker, Wayne, Benny B. Mathias, Maumee, and James R. Sager and Lowell W. Sebring, Toledo, Ohio, assignors to Owens-Illinois, Inc., a corporation of Ohio
Filed May 19, 1965, Ser. No. 456,975
5 Claims. (Cl. 33—148)

This invention relates to apparatus for gauging the diameter of cylindrical objects.

More particularly, this invention relates to apparatus for gauging the O.D. of glass tubing on a continuous basis while the tubing is being produced.

It has been the practice in the past to gauge the diameter of glass tubing by various systems such as utilizing the optical interference method disclosed in U.S. Patent No. 3,027,457 of R. J. Mouly. Optical systems have inherent difficulty, in that most glass tubing, being of a transparent character, transmit, reflect and refract visible light which causes difficulties in utilizing the image for gauging the diameter of the glass. To obviate these problems, it has been proposed to examine glass tubing by utilizing an ultra-violet source as the illuminating means to which the tubing is opaque. However, in all instances where optics are involved, where the utilization light is either in the visible or near visible spectrum, there is always an inherent source of inaccuracy, in that it is difficult and expensive to maintain the light source at a given level. As would be expected, a fluctuating light source can result in erroneous readings being obtained.

It is also current practice to gauge the diameter of glass tubing by utilizing calipering devices. These calipering devices have many designs; however, most of them have one common failing, in that they have poor dynamic characteristics. It is necessary in many instances to bias the feeler elements against the glass tubing, which may still be in a somewhat deformable state from its production, with sufficient force to assure the continuous contact of the feelers with the tubing. If this force exceeds two pounds, it has the unfortunate characteristic of either causing checks in the tubing or causing slightly flattened sides to the tubing. Excessive biasing force is sometime necessary in order to maintain the feeler elements in contact with the tubing during the drawing process. The feeler elements themselves have considerable inertia through the manner in which they are supported in relation to the tubing being gauged, and thus when the tubing is being drawn, any whipping or lateral movement of the tubing causes the feeler elements to lose contact with the tubing being gauged. It is this poor dynamic mechanical response of existing gauges of the feeler type that render them inaccurate.

With the foregoing in mind, applicants have devised a gauge which has greater dynamic mechanical response and greater accuracy of measurement. They have overcome many of the deficiencies presently existing in gauges by utilizing a combination of rigid radial arms of substantial length to support gauging rollers. They have also provided pivotal application of the restoring force to the rollers by selection of linkage mechanism in which there is zero slop.

With the foregoing in mind, it is an object of this invention to provide an O.D. gauging apparatus which has greater dynamic mechanical response and accuracy of measurement.

It is a further object of this invention to provide apparatus for gauging the O.D. of glass tubing in which the restoring force is kept to a minimum without disturbing the accuracy of the measurements.

Other and further objects will become apparent from the following description taken in conjunction with the attached drawings, wherein.

Glass tubing "T," which it is desired to gauge, is normally produced in what is termed a "tubing alley." It is formed, particularly in the well-known Danner process, by drawing the glass over a mandrel which is in a downwardly inclined attitude and as the glass is drawn it is moved in a catenary to a generally horizontal attitude and is continuously drawn in a horizontal direction until sufficiently cooled so that it will retain its shape. It is customary to gauge the O.D. of the tubing as it is being formed so that control of the inflating air which is introduced through the Danner tube and the draw rate may be controlled. It is through an interrelationship of these measurements that production of tubing of a selected O.D. is formed. The gauging of the O.D. takes place downstream of the tubing draw and in many instances the tubing is still in a relatively hot state and capable of being deformed.

Figure 1:
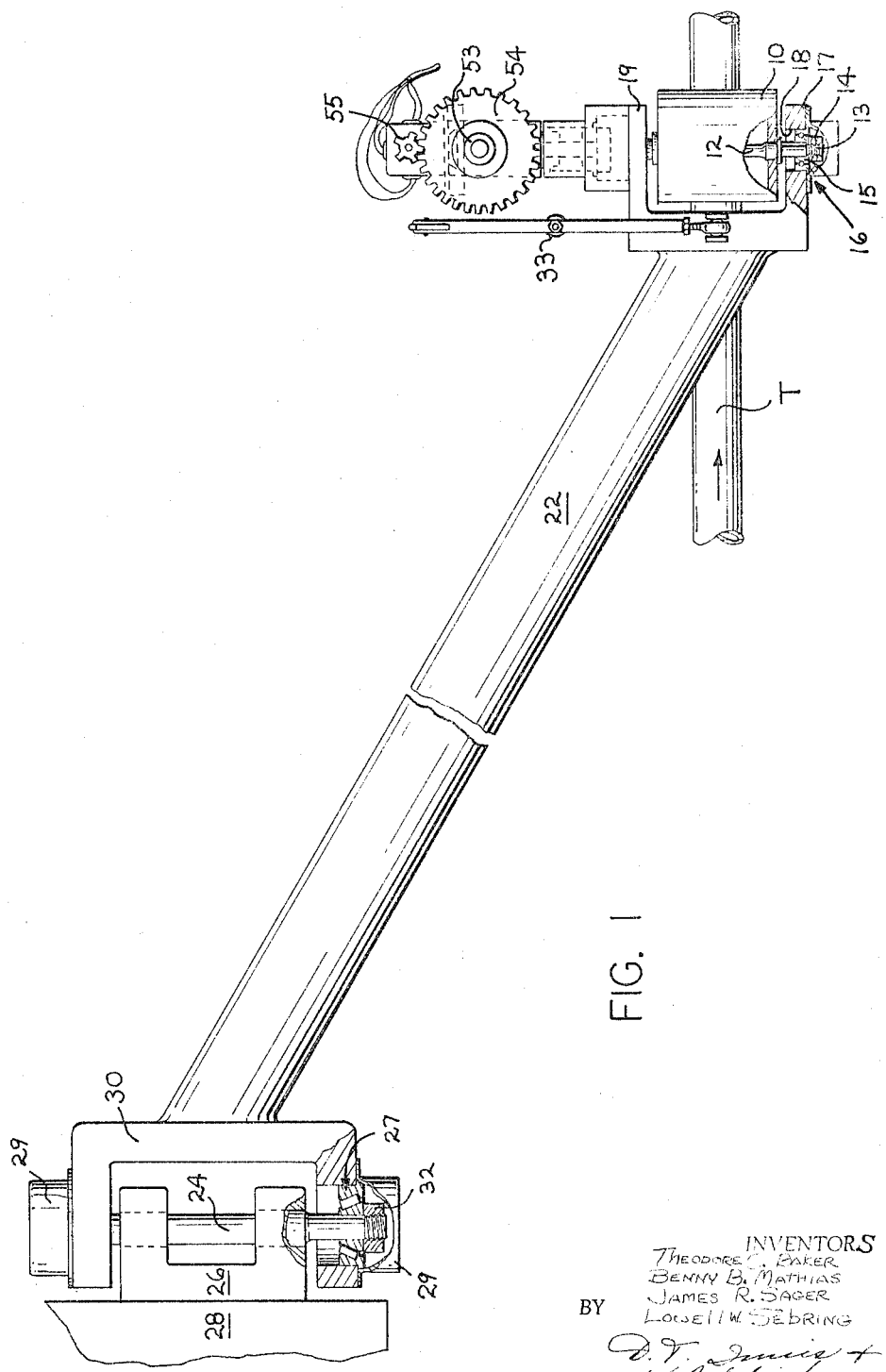
FIG. 1 is a side elevational view, with parts broken away, of the apparatus of the invention.
Figure 2:
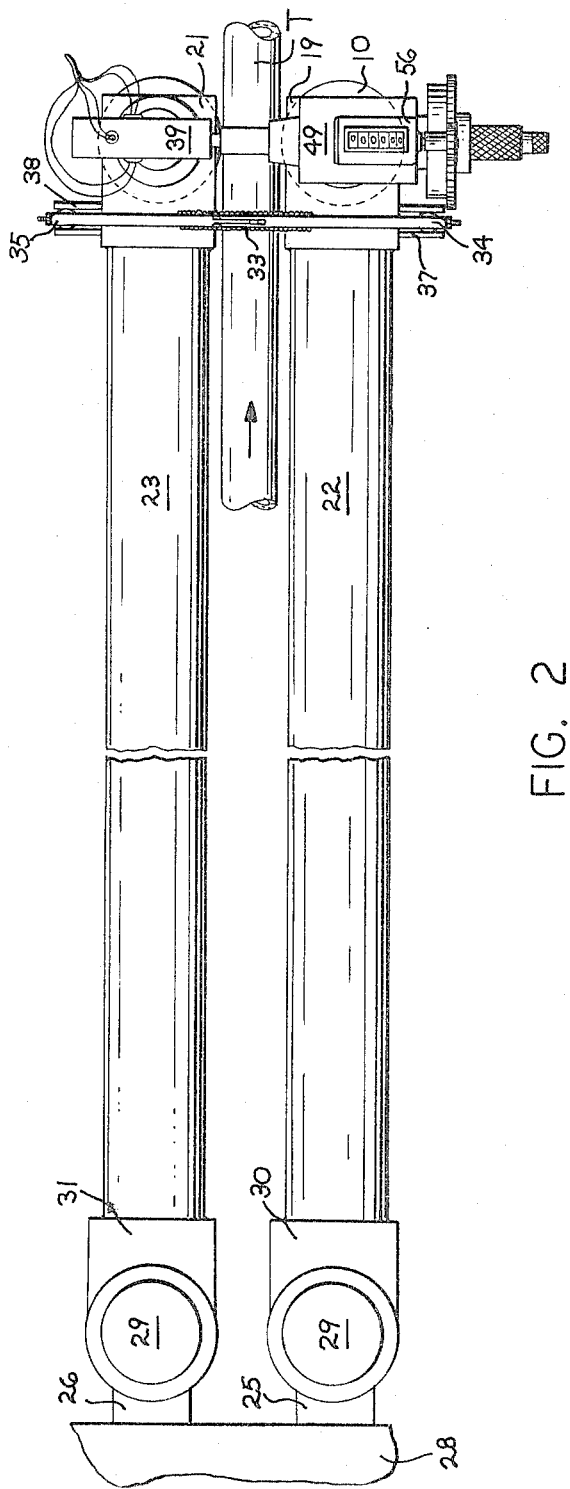
FIG. 2 is a top plan view of the apparatus of FIGS. 1 and 3.

As shown in the drawings, the tubing "T" will be flowing in the direction of the arrow shown thereon in FIGS. 1 and 2 where it is passed between a pair of gauging rollers 10 and 11. The gauging rollers, as can best be seen in FIG. 1, are formed of hollow, cylindrical members closed at their ends. A pivot shaft 12 passes axially through the roller 10 and is fixed with respect to the roller. As can be seen when viewing FIG. 1, the shaft 12 is provided with a threaded end 13 to which a nut 14 is adapted to be fixed. The shaft 12 extends through the inner race 15 of a ball bearing, generally designated 16.

The inner race 15 is joined to the shaft by a press fit. The outer race 17 of the bearing 16 is press fitted in a lower opening 18 formed in a roller clevis 19. A covering 20 is placed over the bottom of opening 18 and closes the opening against intrusion of dust or other foreign particulate matter into the bearing system. The upper end of the shaft 12 is similarly mounted in bearings through an opening formed in the upper arm of the clevis 19. In this manner the roller 10 is mounted for rotation about its vertical axis without "slop." The other roller 11 is similarly mounted in a roller clevis 21.

The clevis 19, as best shown in FIGS. 1 and 2, is fixed to one end of a radially extending, elongated arm 22. An identical elongated radial arm 23 has the clevis 21 fixed to its downwardly and outwardly extending end. The two radial arms 22 and 23 are supported by two trunnions 24 fixed to mounting brackets 25 and 26 by means of tapered roller bearings 27 (see FIG. 1) which may be taken up so as to have zero play.

The trunnion holes are accurately jig-bored in the mounting brackets 25 and 26 and the trunnions 24 are held in place with a shrink fit. All play is thus eliminated at the mounting end of the radial arms. It should be understood that the mounting brackets 25 and 26 are fixed to a stationary support member 28. Dust coverings or caps 29 close off the ends of the bearing houses so as to prevent intrusion of dirt or dust.

As can be seen when viewing FIG. 1, the arms 22 and 23 are integrally formed with trunnion clevises 30 and 31 at their upper ends. The roller bearings are press fit into the trunnion clevis of the radial arms in a similar manner to the mounting of the ball bearings with respect to the gauging roller and roller clevis. As pointed out above, the tapered roller bearings may be taken up by tightening of nuts 32 threaded on the ends of the trunnions 24. By providing the interference fits used at all bearings, a gauge of high accuracy is produced.

Inasmuch as the present gauge operates on the principle of opposed contact, it is necessary to measure the distance between the rollers. For accuracy it is necessary that the rollers be biased with a slight amount of force in a direction toward each other. This biasing force is applied by a spring 33 which extends between, and is adjustably fastened with respect to, a pair of pivotally joined arms 34 and 35.

Figure 3:
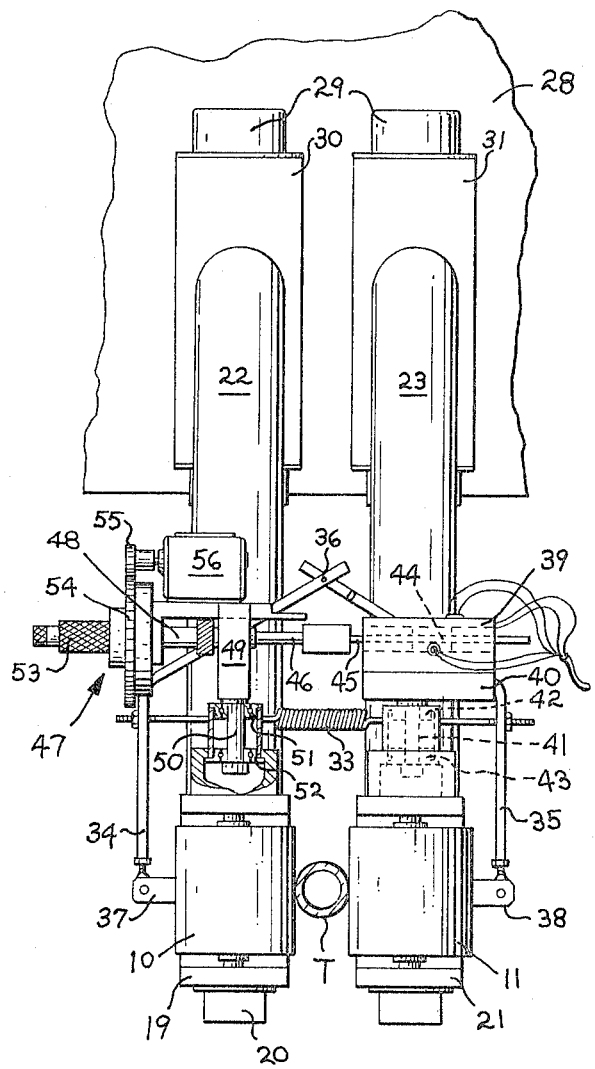
FIG. 3 is a front elevational view of the apparatus of FIG. 1, with parts broken away to illustrate the transducer mounting.

As is best shown in FIG. 3, the two arms 34 and 35 are pivotally connected at 36. The opposite ends of the arms 34 and 35 are pivotally connected to the roller clevises 19 and 21 respectively at projections 37 and 38 integrally formed on the roller clevises midway of the heights of the rollers. The connections between the links 34 and the projections 37 are provided by Heim Unibal Spherical Rod End Bearings, manufactured by Heim Company, Fairfield, Connecticut. Thus it can be seen that the biasing force is applied to the rollers by the tension spring 33 acting between the arms 34 and 35.

Application of the bias force to these points on the roller clevises minimizes the chance of any torque being applied to the rollers which would twist the radial arms and cause the rollers' axes to become non-parallel. A mechano-electrical transducer is mounted on the clevises to gauge the separation between the rollers. The transducer takes the form of a linear variable differential transformer whose coils are contained within the member 39.

The member 39 is fixed to a mounting block 40 which has a vertically downwardly extending shaft 41 connected thereto. The shaft 41 is supported within roller bearings 42 and 43 carried by the roller clevis 21.

The movable core 44 of the linear variable differential transformer is fixed to a shaft 45 which in turn is coupled to the output shaft 46 of a micrometer, generally designated 47. The micrometer 47 is of the usual style and has its barrel 48 fixed to a mounting block 49 which in turn is rotatably mounted by shaft 50 and roller bearings 51 and 52 to the roller clevis 19.

The micrometer 47 is provided with the usual knurled rotating knob 53 and upon rotation of the knob 53 a gear 54 is rotated. For convenience of reading, the gear 54 meshes with a drive gear 55 of a counter 56 mounted for sliding movement with respect to the block 49 through the dovetail and slot arrangement (see FIGS. 1 and 3). The micrometer setting, as read from the counter 56, provides an accurate indication of the actual displacement of the two gauging rollers 10 and 11 when the output voltage of the linear variable differential transformer is zero. Zero voltage indicates the positioning of the core of the transformer in the center of or in a symmetrical relationship with respect to the secondary windings of the transformer. Once the setting has been made with respect to the proper spacing of the rollers 10 and 11, the micrometer is normally left in its set position and deviations from this pre-set condition will be indicated by variations in the voltage output of the linear variable differential transformer.

It should be understood that the voltage output is electrically processed both as to phase and amplitude to determine if the gauging roller separation is over or under a predetermined amount and the extent to which the separation may be over or under this predetermined amount. When the separation exceeds the predetermined tolerance, the output of the transformer may be set to actuate a reject signal. In other words, if the magnitude of the output of the transformer is above a certain minimum, a reject signal will be provided.

Other and further modifications may be resorted to within the spirit and scope of the appended claims.

We claim:

1. Apparatus for gauging the diameter of glass tubing comprising, a pair of elongated, radial arms, means mounting said arms for swinging movement about laterally displaced vertical axes, a gauging roller carried by the extending end of each arm and adapted to contact the sides of the tubing to be gauged, said rollers being mounted for rotation about spaced-apart, parallel, vertical axes in their respective arms, a horizontal micrometer carried on the end of one of said arms and mounted thereto for pivotal movement about the vertical axis of the roller, a linear variable differential transformer, means mounting the transformer coil to the end of the other arm for pivotal movement about the vertical axis of the roller, means coupling the transformer core to the end of the micrometer screw with the core extending within the coil of said transformer, and interconnected means pivotally connected to said roller supports intermediate the height of the rollers for biasing said rollers toward each other.

2. Apparatus for gauging the diameter of glass tubing comprising, a pair of elongated, radial arms, means mounting said arms for swinging movement about spaced-apart, vertical axes, a gauging roller carried by the extending end of each arm and adapted to contact the opposite sides of the tubing to be gauged, said rollers being mounted for rotation about vertical axes in their respective arms, a horizontal micrometer having its barrel connected to the end of one of said arms and mounted thereon for pivotal movement about the vertical axis of the roller, a linear variable differential transformer, means connecting the coil of the linear variable differential transformer to the end of the other arm and mounted thereon for pivotal movement about the vertical axis of the roller, means coupling the core of said linear variable differential transformer to the end of the micrometer shaft, with the core positioned within the coil of said linear variable differential transformer, means, pivotally connected to said roller supports intermediate the height of the rollers, for biasing said rollers toward each other, and means connected to said linear variable differential transformer for indicating the relative position of the core and coil as an index of the diameter of the glass tubing.

3. Apparatus for gauging the diameter of cylindrical glass members comprising, a support plate, a pair of laterally spaced trunnions fixed to said support with their axes vertical, a first clevis carried by each trunnion, a downwardly and outwardly extending elongated arm fixed to each clevis, said arms having a second clevis fixed to the opposite ends thereof, a cylindrical roller, having its axis vertical and supported by each said second clevis, each roller being supported in its clevis by ball bearings fixed to the upper and lower openings in the clevis and a vertical shaft extending coaxially through said bearings with the roller intermediate the length thereof, pivot means connected to each said clevis intermediate the height thereof, biasing means connected between said pivot means for biasing each said second clevis toward each other with a force no greater than one pound, a vertical shaft, pivotally supported by each said second clevis, and located in axial alignment with the axis of the rollers, a horizontally positioned linear variable differential transformer, means connecting the core of said transformer to the vertical shaft supported by one second clevis, means connecting the coils of said transformer to the other of said vertical shafts supported by the other of said second clevis, and means connected to the transformer for indicating the relative displacement of said vertical shafts.

4. Apparatus for gauging the diameter of cylindrical glass members comprising, a support plate, a pair of laterally spaced trunnions fixed to said support with their axes vertical, a first clevis carried by each trunnion, a downwardly and outwardly extending elongated arm fixed to each clevis, said arms having a second clevis fixed to the opposite ends thereof, a cylindrical roller, having its axis vertical, supported by each said second clevis, each roller being supported in its clevis by ball bearings fixed to the upper and lower openings in the clevis and a vertical shaft extending coaxially through said bearings with the roller intermediate the length thereof, pivot means connected to each said clevis intermediate the height thereof, biasing means connected between said pivot means for biasing each said second clevis toward each other with a slight force, transducer means connected between said clevises and responsive to the relative position thereof for providing an output signal indicative of the spacing of the two rollers and indicating means connected to the output of said signal producing transducer.

5. The apparatus as defined in claim 4, wherein said biasing means comprises a pair of arms, pivotally connected together at one end with their other ends connected to said pivot means, and an adjustable tension spring connected between said arms intermediate their lengths.

References Cited by the Examiner
UNITED STATES PATENTS

| | | | |
|---|---|---|---|
| 1,798,650 | 3/1931 | Berlawitz | 33—148 |
| 2,308,033 | 1/1943 | Terry et al. | 33—148 |
| 2,603,001 | 7/1952 | Fox et al. | 33—147 |
| 2,721,317 | 10/1955 | O'Neill | 33—178 X |

LEONARD FORMAN, *Primary Examiner.*